(12) United States Patent
Karaoguz et al.

(10) Patent No.: US 8,009,608 B2
(45) Date of Patent: Aug. 30, 2011

(54) METHOD AND SYSTEM FOR EXTENDED NETWORK ACCESS SERVICES ADVERTISING VIA A BROADBAND ACCESS GATEWAY

(75) Inventors: Jeyhan Karaoguz, Irvine, CA (US);
Marc Abrams, Aliso Viejo, CA (US);
Nambirajan Seshadri, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 734 days.

(21) Appl. No.: 11/021,294

(22) Filed: Dec. 23, 2004

(65) Prior Publication Data

US 2005/0232186 A1    Oct. 20, 2005

Related U.S. Application Data

(60) Provisional application No. 60/563,894, filed on Apr. 16, 2004.

(51) Int. Cl.
*H04W 4/00* (2009.01)
*H04M 1/00* (2006.01)
(52) U.S. Cl. .................. 370/328; 455/560; 455/418
(58) Field of Classification Search ............... 455/552.1, 455/418–420, 560–561; 370/328
See application file for complete search history.

(56) References Cited

U.S. PATENT DOCUMENTS

| | | | | |
|---|---|---|---|---|
| 6,006,106 A * | 12/1999 | Cook et al. | .................. | 455/552.1 |
| 6,233,463 B1 * | 5/2001 | Wiedeman et al. | ......... | 455/552.1 |
| 6,327,355 B1 * | 12/2001 | Britt | ......................... | 379/201.03 |
| 2002/0052915 A1 * | 5/2002 | Amin-Salehi | ................. | 709/203 |
| 2003/0033519 A1 * | 2/2003 | Buckman et al. | ............. | 713/153 |
| 2003/0134622 A1 * | 7/2003 | Hsu et al. | ....................... | 455/414 |
| 2004/0028009 A1 * | 2/2004 | Dorenbosch et al. | ......... | 370/329 |
| 2004/0029567 A1 * | 2/2004 | Timmins et al. | ........... | 455/412.1 |
| 2004/0048624 A1 * | 3/2004 | Ko et al. | ....................... | 455/457 |

* cited by examiner

*Primary Examiner* — Lester Kincaid
*Assistant Examiner* — Steven Lim
(74) *Attorney, Agent, or Firm* — McAndrews, Held & Malloy

(57) ABSTRACT

A system and method supporting the advertising of extended network access to multimedia services via a broadband access gateway is disclosed. A representative embodiment of the present invention may comprise a wireless interface and may be capable of exchanging multimedia communication between the wireless interface and a broadband network. The gateway may determine available media-related services, and may transmit information about those services to an access device that may comprise, for example, a mobile multimedia handset, a personal digital assistant, and a personal computer. The access device may notify a user of the availability of the media-related services using visual and/or audible means. The gateway may receive from the access device capability and/or subscriber related information, and the gateway may transmit service information based upon the capability and/or subscriber-related information.

45 Claims, 6 Drawing Sheets

METHOD AND SYSTEM FOR EXTENDED NETWORK ACCESS SERVICES ADVERTISING VIA A BROADBAND ACCESS GATEWAY

RELATED APPLICATIONS

The present application makes reference to, claims priority to, and claims benefit of U.S. Provisional Patent Application Ser. No. 60/563,894, entitled "Method And System For Handling And Backhauling Traffic From A Wired And/Or Wireless WAN, LAN, And/Or PAN Using A Broadband Access Gateway", filed Apr. 16, 2004, the complete subject matter of which is hereby incorporated herein by reference, in its entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

One major common problem faced by cellular and landline service providers is market competition. In today's climate of competitive markets, cellular service providers have found that one way for them to grow market share and defend their businesses is to be proactive and form alliances, and to partner with landline service providers. In addition, cellular service providers seek to differentiate their service offerings, and to capture the largest portion of market revenue by meeting an ever increasing demand for access to a wide range of media forms such as MP3 encoded audio, still and video imaging, data, instant messaging, and email. In a similar manner, the landline service providers have found that to grow market share and ward off competition, they too must be proactive and form alliances, and to partner with cellular service providers. Support for broad economical access to these converging forms of communication is needed to enable unfettered market growth, and to support the development and use of new handheld devices needed to provide increasing levels of mobile multimedia communication functionality.

Although the formation of alliances and partnerships between cellular service providers and landline service providers may help to ward off competition, such alliances and partnerships are faced with other problems. For example, the erection of cellular infrastructure such as cellular towers may be an expensive venture since this may require acquisition of real estate, whether in the form of outright purchases or through leasing. Cellular infrastructure also requires the establishment of one or more expensive backbone links to handle core network traffic. Another cellular-related problem is that the cellular signals do not penetrate and propagate in buildings such as homes and offices very well. This is especially true with the frequencies that are typically utilized in the United States, which may vary between 800 MHz and 1900 MHz or 1.9 GHz.

At the current time, a user of a wireless mobile device such as, for example, a WiFi-equipped PDA, a Bluetooth-equipped cellular phone, or a WiFi-equipped laptop that wishes to access wide area networks such as the Internet must actively seek information via personal acquaintances, websites and printed materials to determine the locations of wireless access points for their use. For example, many fast-food restaurants and up-scale coffee shops currently provide WiFi Internet access, but provide little or no indication on the premises that such services are available. Potential users of communications services, in particular those unfamiliar with an area such as tourists and business travelers, are left unaware of the existence of such points of access, and the services that may be available. They may pass through areas having such coverage while they are, in fact, in need of access to communication facilities. On the other hand, those that operate such areas of wireless service coverage have few tools available to notify users of wireless-enabled devices of the availability and particulars of services that may be accessible. In addition, no efficient means exists to offer access to a variety of media services, or to know whether any potential users of such services are with range of the access points through which they might be made available.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Aspects of the present invention may be seen in a system supporting advertising of user accessibility to multimedia information services. Such a system may comprise a gateway communicatively coupled to a broadband network and at least one wireless interface. The gateway may be capable of selectively exchanging multimedia information among the at least one wireless interface and the broadband network, and of communicating with a plurality of access devices via the at least one wireless interface. The gateway may also be capable of providing to the plurality of access devices via the at least one wireless interface, access to at least one media-related service. In addition, the gateway may capable of transmitting service information, via the at least one wireless interface, to at least a portion of the plurality of access devices. The at least a portion of the plurality of access devices may be capable of notifying a user of the received the service information.

In a representative embodiment of the present invention, the multimedia information may comprise at least one of streaming video, broadcast video, voice, digital data, text, digitized audio, digitized still images, digitized video, and digitized music. The at least one media-related service may comprise at least one of accessing, recording, playing, exchanging, transmitting, receiving, converting, and translating. The gateway may be capable of downloading executable code for operating at least one of the gateway and an access device. Service information may comprise information indicating the availability of media-related services. The at least one wireless interface may be compliant with the Bluetooth V1.2 or compatible personal area network (PAN) specification, and may be compliant with at least one of the Institute of Electrical and Electronics Engineers (IEEE) 802.11a, 802.11b, 802.11g, and 802.11n standards. The at least one wireless interface may communicate using an unlicensed frequency band, and may communicate at a frequency of approximately 2.4 gigahertz.

In various representative embodiments of the present invention, the broadband network may comprise at least one of a digital subscriber line (DSL) network, a cable network, a satellite network, a cellular network, and the Internet. The cellular network may comprises at least one of a global system for mobile communications (GSM) network, a time division multiple access (TDMA) network, a code division multiple access (CDMA) network, and a universal mobile telecommunications system(UMTS) network. Notifying may comprise displaying a visual indication based upon the service advertisement information, and notifying may comprise playing an audible indication based upon the service advertisement information. The gateway may collect access-related information for at least one of the plurality of access devices and the broadband network, and the gateway may manage access to the collected information. In various representative embodiments of the present invention, the plurality of access devices may comprise at least one of a mobile multimedia handset, a personal digital assistant (PDA), a personal computer (PC), a digital scanner, a digital camera, a printer, headphones, and a pointing device. The transmitted service information may be based upon at least one of subscriber information and capability information indicating the ability of an access device to use multimedia information.

Additional aspects of the present invention may be found in a method of operating a gateway supporting advertising of multimedia information services. Such a method may comprise initializing communication via a broadband network, and determining, via at least one of a personal area network, a wireless local area network, and the broadband network, service information comprising availability of media-related services. The method may also comprise detecting, via at least one of the personal area network and the wireless local area network, the presence of an access device, and transmitting the service information to the access device via the at least one of the personal network and the wireless local area network. The method may comprise collecting, via at least one of the personal area network, the wireless local area network, and the broadband network, information comprising accessibility of at least one access device. In addition, the method may comprise receiving at least one of subscriber information and capability information indicating the ability of an access device to use multimedia information.

In a representative embodiment in accordance with the present invention, the personal area network may be compliant with the Bluetooth V1.2 or compatible personal area network (PAN) specification. The personal area network may communicate using an unlicensed frequency band, and the personal area network may communicate at a frequency of approximately 2.4 gigahertz. The wireless local area network may be compliant with at least one of the Institute of Electrical and Electronics Engineers (IEEE) 802.11a, 802.11b, 802.11g, and 802.11n standards. The broadband network may comprise at least one of a digital subscriber line (DSL) network, a cable network, a satellite network, a cellular network, and the Internet. The cellular network may comprise at least one of a global system for mobile communications (GSM) network, a time division multiple access (TDMA) network, a code division multiple access (CDMA) network, and a universal mobile telecommunications system(UMTS) network. In various representative embodiments of the present invention, the multimedia information may comprise at least one of streaming video, broadcast video, voice, digital data, text, digitized audio, digitized still images, digitized video, and digitized music. The at least one access device may comprise at least one of a mobile multimedia handset, a personal digital assistant (PDA), a personal computer (PC), a digital scanner, a digital camera, a printer, headphones, and a pointing device.

Yet other aspects of the present invention may be observed in a machine-readable storage, having stored thereon a computer program having a plurality of code sections executable by a machine, for causing the machine to perform the operations of the method described above.

These and other advantages, aspects, and novel features of the present invention, as well as details of illustrated embodiments, thereof, will be more fully understood from the following description and drawings.

DETAILED DESCRIPTION OF THE INVENTION

Aspects of the present invention relate to the seamless merging of wide area networks, from any kind of wired and/or wireless wide area networks, to pockets of wired and/or wireless local area networks and personal area networks, which may be located in homes or other environment such as an office or business. More specifically, aspects of the present invention pertain to the advertisement of various media services available to a user of a compatible mobile wireless device when access to a gateway supporting alternate network connections is detected. Alternate network access may be available via, for example, a personal cellular microcell, a personal area network (PAN), a wired or wireless wide area network (WAN), wireless local area network (WLAN) or other type of network located within a premises such as, for example, a home, office, business, or the like. Services that may be available via an alternate network connection include, for example, access to the public switched telephone network (PSTN); Internet protocol (IP) phone access; extended access to commercial cellular and PCS networks such as, for example, TDMA, CDMA, and GSM; and access to and/or control of a variety of multimedia access devices or networked resources capable of providing streams of images, still pictures, video, and audio; to name only a few. The merging of these various types of networks may enable transparent communication of all types of media between access devices, which may be coupled in a wired or wireless fashion to one or more of these networks. In an embodiment of the present invention, information on available media services may be provided to access devices as they transition from one type of network to another type of network supported by a local access gateway located in, for example, a home, an office, or a business.

Figure 1:
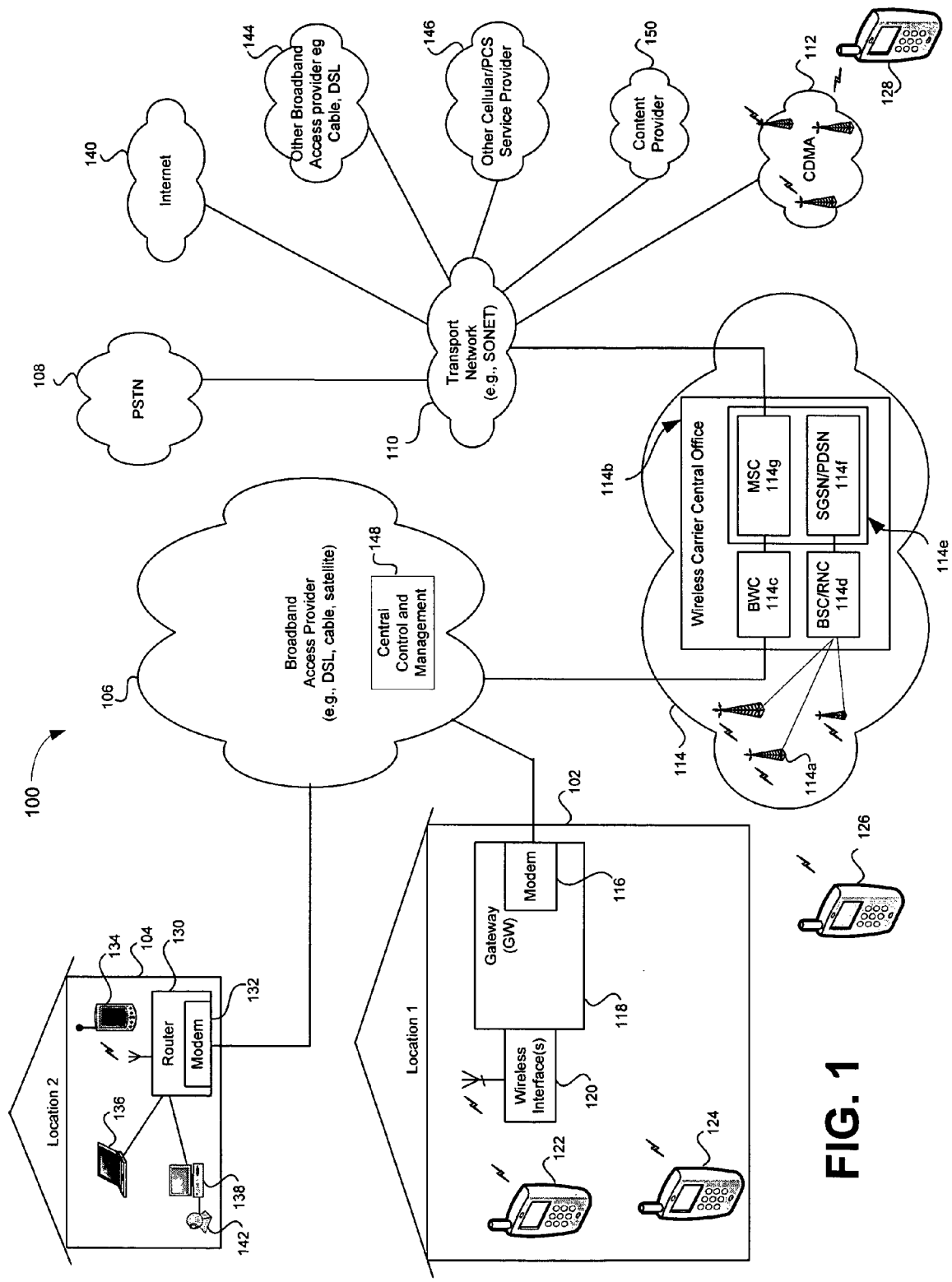
FIG. 1 is a block diagram illustrating an architecture of an exemplary communications system in which a representative embodiment of the present invention may be practiced.

FIG. 1 is a block diagram illustrating an architecture of an exemplary communications system in which a representative embodiment of the present invention may be practiced. Referring to FIG. 1, there is shown a first location 102, a second location 104, a broadband access provider (BAP) 106, public switched telephone network (PSTN) 108, a transport network 110, wireless networks including CDMA network 112 and GSM network 114, and access devices 126 and 128. The first location 102 comprises a gateway 118 having a modem 116, a wireless interface(s) block 120, and the access devices 122, 124. The access devices 122, 124, 126, 128 may comprise, for example, a mobile multimedia handset having a high level of functionality such as, for example, that of one or more of a digital video or still camera, a portable audio (MP3) player, a personal digital assistant, and a voice handset. The access devices 122, 124, 126, 128 may be capable of operating using, for example, a personal area network and/or wireless local area network compliant with, for example, Bluetooth, EEE 802.11 a/b/g/n, and/or IEEE 802.15.3a ultrawideband standards. The second location 104 comprises a router 130 having a modem 132, and a plurality of wireless access devices. The plurality of wireless access devices at the second location 104 may comprise a personal computer (PC) 138, a laptop 136 and a wireless personal digital assistant (PDA) 134. A peripheral such as a digital camera 142 may be coupled to the personal computer 138. Other peripherals such as printers, digital scanners, speakers, and the like, which are not shown, may also be coupled to the personal computer 138 and/or laptop 136. The wireless interface block 120 may comprise a plurality of interfaces such as a Bluetooth interface, an IEEE 802.15.3a ultrawideband interface, and any combination of an IEEE 802.11 a, b, g and/or n interface.

FIG. 1 also comprises an "other broadband access provider" block 144, an "other cellular/PCS service provider" block 146, a central control and management block 148, and content provider 150. The "other broadband access provider block 144" may be, for example, a cable, DSL, or other type of broadband access provider. The central control and management block 148 may comprise suitable logic, circuitry and/or code that may be adapted to handle content delivery and security functions such as authentication, validation, key or certificate management, and authorization. The central control and management block 148 may also be adapted to handle provisioning and service management. In a representative embodiment of the present invention, the central control and management block 148 may establish communications links with, for example, the gateway 118, the broadband access provider 106, the other broadband access provider 144, the other cellular/PCS service provider 146, the CDMA network 112, and the GSM network 114 using actual or virtual connections.

The broadband access provider 106 may be, for example, a cable operator, telephone company, or satellite operator providing Internet access along with other communication services. In instances where BAP 106 is a telephone company, broadband service to locations 102, 104 may be provided via DSL or other broadband access technology. Accordingly, the modems 116, 132 may be DSL modems. In instances where BAP 106 is a cable operator, broadband service to locations 102, 104 may be provided via cable. Accordingly, the modems 116, 132 may be DOCSIS compliant or other type of cable modem. Given the rapid decrease in the cost of leased telephone lines over the past decade or more, the connection to the location 102, 104 may also be T1 or T3 connections. For example, a switch located at a central office (CO) (not shown) may be utilized to couple a T1 or T3 connection between the second location 104 and the PSTN 108.

The gateway 118 may comprise an integrated DSL modem, cable modem or other high-speed modem that may be required for handling a connection such as a T1 or T3 connection. Alternatively, the gateway 118 may be coupled to an external DSL modem, cable modem or other high-speed modem that may be capable of handling connections such as a T1 or a T3 connection. The gateway 118 may be adapted so that it has access to protocol stack information that may be related to the GSM and/or CDMA networks 114, 112, respectively. The gateway 118 may also be adapted to provide protocol support for communication with "other cellular/PCS service provider" block 146.

Each of the CDMA and GSM networks 112, 114 may comprise a plurality of cell sites (a/k/a cellular towers) that are located in geographical cells within each of the networks. Within the GSM network 114, each of the cell sites such as, for example, cell site 114a may comprise a base transceiver station (BTS), and one or more base transceiver stations (BTSs) may be coupled to wireless carrier central office 114b. The wireless carrier central office 114b may comprise a base station controller/radio network controller (BSC/RNC) such as BSC/RNC 114d. One or more base station controllers/radio network controllers (BSCs/RNCs) may be coupled to the core network 114e, that comprises a network edge switch called a mobile switching center (MSC), such as MSC 114g, and a serving GPRS support node (SGSN)/packet data serving node (PDSN) 114f, of the GSM network 114. The mobile switching center may be coupled to, for example, the PSTN 108 via the transport network 110. As an access device moves out of range of a first cell site to within range of a second cell site, the decrease signal power received from the first cell site and the increase in signal power received from the second cell site causes initiation of handoff of a call from the first cell site to the second cell site. In cases where there is no second cell site to handoff to, the call may be maintained by the first cell site power until it is attenuated to a threshold where it is no longer feasible to maintain the call. At the point where the power reaches or falls below this threshold, the call may drop and any related call resources may be relinquished. In a home and/or office environment, it may be desirable to have a second network to which the call may be handed off to.

As an illustration, a user may be on their way home and as the user approaches their home, the signal may fall below a minimum signal power threshold that is required to maintain a call. However, instead of dropping the call, the call may be handed off to, for example, a PAN or a wireless local area network (WLAN) that may be located within the user's home or an unlicensed wireless access system that may be located in the user's home. For example, with reference to FIG. 1, as access device 126 migrates from the vicinity of the serving cell site 114a in GSM network 114 towards the wireless interface 120 in the first location 102, the call may be handed off from the cell site 114a GSM network 114 to the wireless interface 120 coupled to the gateway (GW) 118 at the first location 102. Accordingly, instead of the call being dropped, the call has been seamlessly handed off and is now being handled by the gateway 118 via the wireless interface 120. The resulting wireless data may then be communicated to the GSM network 114 via the broadband connection to the BAP 106 which is connected to the broadband wireless local area network controller (BWC) 114c.

In this illustration, the user is handed off to their PAN, WLAN, or other network located within their home. However, the user could also have been handed off to another network system such as a neighbor's network. In any case, a gateway coupled to the wireless interface which is providing service to the user may communicate at least a portion of the data to, for example, the cable or DSL BAP 106, the GSM network 114, CDMA network 112, other broadband access service provider 144, other cellular/PCS service provider 146 and central control and management block 148. The user may be provided with a notification that indicates the presence of the PAN, WLAN, or other unlicensed network. For example, an icon representative of a personal area network may be displayed on the screen of the access device 126 once a soft or hard handoff is achieved from a serving cell site in GSM network 114 to the wireless interface 120 at the first location 102. A special tone or other audio alert may also be utilized to indicate that the call has switched to the wireless interface 120.

In instances where the gateway 118 detects a compatible access device that may be within the range of the wireless interface 120, the gateway 118 may immediately advertise its available services to the access device. In this regard, the gateway 118 may be adapted to transmit service advertisements to the access device in order to alert a user of the access device of the types of services that are being offered by the gateway 118. Signals containing icons representative of the services may be transmitted to and displayed on a screen of the access device and/or audio alerts may be utilized to notify the user of these services.

In another embodiment of the invention, quality of service (QoS) may also be advertised by the gateway 118. For example, when a user is being serviced by the wireless interface 120, the gateway 118 may advertise that stereo audio is available.

Access devices may be pre-registered so that when they are within the range of the wireless interface 120, the gateway 118 may automatically recognize them. For the pre-registration, an administrator of the gateway 118 at the first location 102 may register access devices that are allowed to access the gateway 118 when they are within the range of the wireless interface 120. Pre-registration may be done prior to the access device accessing the gateway 118. During pre-registration, an administrator or owner of the gateway 118 may enter registration or configuration information such as device IDs of access devices belonging to friends and/or family member's into a registration database associated with the gateway 118. As a result, these devices will be allowed to access at least a portion of the services offered by the gateway 118 whenever they attempt to access the gateway 118 by pressing a single button, for example. Opportunistic registration permits a user of an access device to register with the gateway 118 automatically with little or no effort on the part of the user. In this regard, registration information may be sent to the gateway 118 from an access device during an initial access and the gateway 118 may chose to accept or deny the registration. The registration information may be automatically or manually sent to the gateway 118.

In certain instances, an access device may not have been pre-registered to access the network. In this case, one button access may be provided. A single button such as a hard coded button or software-enabled button on an access device may be programmed to transmit identifying information from the access device to the gateway 118. Identifying information may comprise, for example, an electronic serial number, a member identifier, an administrative identifier, a media access control (MAC) address, an Internet protocol (IP) address, and a credit card account number. Identifying information shared by an access device may also comprise information related to authentication, authorization, and accounting, and may employ a digital certificate. The gateway 118 may utilize this transmitted identifying information to grant or deny access to its services. For example, one button may be programmed to contain access device identifying information related to accessing the services provided by gateway 118 at the first location 102. The gateway 118 may also be adapted to utilize digital certificates to authenticate access devices.

An interactive process may also be provided, whereby the gateway 118 may prompt or request particular information, for example a password from an access device requiring network access. If the particular information is received, then access to at least some of the services provided by the gateway 118 may be granted and if not, the access to at least some of the gateway's services may be denied.

In another embodiment of the invention, the one button access may be provided via software-enabled button (soft button) or hardware-enabled button (hard button). In this regard, the software button may be displayed on a screen of an access device.

A "walled garden" approach may be utilized to provide access to the services that may be offered by a particular gateway, for example, gateway 118. Under the walled garden approach, when an access device first registers or is identified, a basic set of services may be provided by the serving gateway 118 to the access device 124. The basic services offered may vary among each gateway. At least some of the basic services that are provided by a gateway such as gateway 118, may be offered without authenticating the access device 124. However, other services may only be offered if an access device such as access device 124 is properly authenticated. These services that are offered may be services that were advertised by the gateway 118.

In an aspect of the invention, access to additional services may be granted based on, for example, user identity, access device identity and or user input. The services offered to an access device by a gateway may be arranged in a hierarchical structure such as a tier. For example, in a first tier, a user may be prompted to enter membership information such as a member identification number. Upon authentication of the membership identification number, the first tier may provide restricted access with pop-up advertisements that may not be disabled. In a second tier, for example, a user may be prompted to enter a password. Upon authentication of the password, second tier information may provide restricted access to gateway services without pop-up advertisements. In a third tier, for example, entering billing information such as an account number or credit card or check card number may provide unlimited and/or unrestricted access to all the services offered by a gateway. A fourth tier may provide only operating instruction and information for guests.

An administrator of the gateway may establish the type of access provided by the walled garden. For example, if the first location 102 is a hotspot at a Café, the provider of the gateway may establish the service access levels or tiers that may be provided by the gateway 118.

When an access device is within the range of the gateway 118, wireless service is handed off from a serving cell site 114a in the GSM network 114 to the gateway 118. The access device may be authenticated by the gateway 118 and permitted to access at least some of the services offered by the gateway 118. Once the access device is authenticated, at least a portion of the information on the access device may be made available as a networked resource via the gateway 118. A user of the access device may chose whether information on the access device may be made available to the gateway and if so, that information which will be made available, and that information which will be unavailable to the gateway 118. In this regard, where information is made available, the gateway 118 may maintain a list of the resources that may be available on access devices that may be coupled to the gateway 118. For example, a list of contact information, calendar information, audio files, video file and/or data files stored on the access device may be sent to the gateway 118.

The resources that are available on the access device may also be advertised to other access devices that may be in communication with the gateway 118. Advertisement of the resources that may be available on an access device may be restricted to, for example, a list of particular devices, a particular type of devices or to a particular user. Accordingly, a user may have to be properly authenticated prior to certain information being made available to the user. Additionally, advertisement of the resources may cause certain icons representative of the resources to be displayed on other access devices. In a similar manner, icons representative of the resources that may be available on these other access devices may also be presented on the access device.

An access device may be provided with a welcoming screen that may allow a user of a device to sign up for either free or paid services. Once the signup is complete, subsequent access by the user may be authenticated by the gateway 118 utilizing the signup information. Whenever an access device registers with and/or is authenticated by the gateway 118, information on the access device may be updated and/or synchronized with information that may be on the gateway 118.

Devices within the location of the gateway 118 may be configured to register certain portions of their data content with the gateway 118 through a gateway registration process. Once data for these devices is registered to the gateway 118, the gateway may maintain a database, which keeps track of the data that is available, and its location. Accordingly, if the data previously stored in the database is no longer available, then information representative of the previously stored data may be removed from the database. Data from devices coupled to the gateway 118 such as on laptops, CD players, digital video disk (DVD) players, TIVO, personal video recorders (PVRs), personal digital assistants (PDAs) and other devices, may be registered with the gateway 118. This data may comprise audio, video, still pictures, and/or text.

At least a portion of the registered data may be made available to other network access devices via the gateway 118. In an aspect of the invention, the gateway 118 may be adapted to maintain a searchable list of data that may be available via the gateway. In this regard, the gateway may comprise a search engine that may be utilized to locate and distribute data that may be made available through the gateway 118. In another aspect of the invention, data may be made available to access devices via advertising by the gateway 118. Access devices may be configured to seek out particular data that may be of interest. Accordingly, an access device may be adapted to receive and process only those gateway advertisements may fit particular criteria. Those advertisements that may not fit the particular criteria may be discarded or ignored.

When an access device is within the range of the gateway 118, wireless service may be handed off from a serving cell site 114a in the GSM network 114 to the gateway 118. The access device may be authenticated by the gateway 118 and permitted to access at least some of the services offered by the gateway 118. Once the access device is authenticated, a user of the access device may have a desire to locate a particular video presentation. The user may access the search engine, which may have been advertised to the user's access device by the gateway 118. The search engine may appear on the display of the user's access device as an icon. The user may then activate a search by selecting the search engine icon, inputting a name of the video presentation and executing the search.

In another embodiment of the invention, the gateway may be adapted to classify information based on a given criterion. This classification may assist with locating information based on a particular criterion. In this regard, a user of the access device may be presented with a list of classifications and may select one, which may be of interest based on a particular criterion. This may narrow the focus of a search.

The gateway may also be utilized to facilitate seamless synchronization of data between devices that may be wired or wirelessly coupled to the gateway 118. For example, audio files located in a music folder on a PC coupled to the gateway 118 may be synchronized with a wireless media player coupled to a hot spot in an airport while a user of the wireless access media player waits to board a flight. In this regard, the gateway may determine what files need to be synchronized and control how the synchronization is accomplished. The same is true for files that may be downloaded from the PC to the wireless access media player, and for files that may be uploaded from the wireless access media player to the PC. Calendar and/or contact information may also be updated and/or synchronized with a mobile multimedia handset in a similar manner utilizing the gateway 118.

A location-aware service determines an approximate location of a network device and adapts delivery of a particular service application and/or content according to a quality of service criterion. The delivery of location-aware services may be controlled by the gateway 118. For example, a user of an access device may request playback of an audio clip via the gateway 118. After receiving the request for playback of the audio clip, the gateway 118 may determine that a channel between the gateway 118 and the user's access device may only be capable of maintaining a reduced playback rate. As a result, instead of sending 128 kbps encoded audio data, then the gateway may send 96 kbps data. Hence, in a case where the audio data was originally stored in 128 kbps sampled audio data, then the gateway 118 may transcode the 128 kbps sampled data to 96 kbps audio data.

In another illustrative embodiment of the invention, while the GSM network 114 is servicing the access device, lower compression rates may be utilized to provide service to the access device. However, when the access device roams within range of the wireless interface 120 and is being served by the gateway 118 through wireless interface 120, higher compression rates may be utilized. For example, audio data sampled at a data rate of 64 kbps may be utilized for playback on an MP3 enabled telephone while the phone is being serviced by a cell site 114a in the GSM network 114. However, once the MP3 enabled telephone is within the operating range of the wireless interface 120 and is being serviced by the gateway 118, the gateway 118 may automatically adapt to a higher data rate of, for example, 92 kbps or 128 kbps.

Automatic format conversion by the gateway 118 may include converting data from a first format to at least a second format suitable for delivery and/or display on an access device. This may permit data that would otherwise be incompatible with a first access device to be played on that first access device. For the location-aware services based on QoS, data was converted from a first format 128 kbps to a second format 96 kbps to achieve and/or maintain a particular QoS, but the data type remained the same. In this case, the audio format and/or its data type may be different. For example, if the audio format was MP3, then after the conversion, the format remained WAV and/or the sampling rate may have decreased from 128 kbps top 96 kbps.

In conventional wired caller ID systems, a name and/or directory number (DN) of a calling party may be transferred either in-band or out-of-band to a called party and may be displayed on the called party's caller ID display when a call is answered. In these conventional systems, the caller ID information is limited to a callers name, directory number (DN), general location and/or time of call. In wireless telephone systems, in order to save on bandwidth, only a caller's directory number is transferred and displayed to a calling party. However, if the calling party's directory number and name is stored in the called party's phone, then the stored name and stored directory number will be presented on a display of the called party's terminal. In this case, the stored directory number is compared with the transferred caller's directory number, and if a match occurs, then a name corresponding to the matching directory number is also displayed on the called party's terminal.

In accordance with an embodiment of the invention, the gateway 118 is adapted to determine the appropriate caller ID information that may be displayed in a called and/or calling party's caller ID. In this case, reverse caller ID information may be displayed on both a calling and a called parties terminal by the gateway 118.

If a called and/or calling device is a mobile multimedia handset and/or laptop, for example, contact or other personal information may be displayed the caller's and/or calling party's directory number. The level or amount of information that may be displayed may be varied. Certain sensitive information relating to either the called or calling party may be restricted from being displayed.

In current cellular communication systems, over the air (OTA) programming is utilized to program a cellular telephone during the provisioning process. In some instances, cellular providers have established websites that may be utilized or OTA programming. In this regard, a cellular subscriber may access the website and enter information such as the assigned directory number and the electronic serial number of the cellular telephone being programmed.

In accordance with a representative embodiment of the invention, an access device may be registered using over the air programming via the gateway 118. A user of an access device may send access device information to the gateway 118 using, for example, a default interface that may be presented to and displayed on a screen of the access device when the access device first enters the service area of the wireless interface 120. During registration, the capabilities of an access devices may be sent to the gateway 118 and may be shared with devices that may be coupled to the gateway 118.

Since the gateway acts as a registrar of information for all the access devices that may be wired or wirelessly coupled to it, the gateway may function as a personal digital assistant for any of these access devices. In an illustrative example, a first device, a first PC and a second PC are being serviced by the gateway 118. The first access device receives a call and the caller ID information shows the callers name, home directory number and home address. However, the first PC contains the business address for the caller and the second PC contains the monthly calendar information for the caller. Assume that the caller had a desire to setup a business meeting. In accordance with an aspect of the invention, the gateway 118 may be adapted to provide the business address of the caller to the first access device and also provide the caller's calendar to the first access device. In this manner, the network centrally provides all the information necessary for scheduling the meeting. In this example, the first PC may belong to the user of the first access device and the second PC may belong to the caller.

This concept may be extended to a look-up or 411 directory assistance on the Internet. The lookup may also be location dependent. In this regard, if a user is located in Hollywood and requests a hotel location, the gateway 118 may only cause the hotels that are located in Hollywood to be displayed to the user.

The gateway 118 may also be adapted to create profile information based on data usage. These created profiles may be utilized to create social networks for people having common interests. Accordingly, users may be permitted to post their interests and also select those people having similar interests based on the created profile. Based on the created profile information and the posted user interests, the gateway 118 may also generate a list of those people who have similar interest and also those users that may potentially have similar interests.

Given the capability to seamlessly operate an access device as one migrates from outside the home into the home, it is desirable to have a single device that may be adapted to control at least some of the devices that may be found within the home. In addition to its normal voice or data communication operating mode, an access device may be configured to operate as a universal remote that may be utilized to remotely control a plurality or other devices such as a TV, DVD, CD, Stereo, display monitor, or a combination thereof. Most access devices currently have an IR transmitter, which may be adapted to communicate with other IR receiver devices.

The access device may be used for wireless communication and for remotely controlling an electronic device with as a TV, CD/DVD recorder/player, or other device. The access device may also include at least one soft-button that may be enabled through the gateway 118 and may be utilized to control any other device that may be coupled to the gateway 118.

The gateway 118 is adapted to virtually aggregate data that may be visible from a plurality of access devices or other network devices. Although the gateway 118 may be adapted to store some service and content related information, the gateway 118 does not actually store copies of data that resides the access devices and/or other network devices that may be wired or wirelessly coupled to it. However, the gateway 118 may store, for example, metadata information that may be utilized to locate and access the information stored on the access devices and/or other network devices. The gateway is therefore adapted to function as a registrar of both service and content related information.

Whenever an access device registers with and/or is authenticated by the gateway 118, information may be collected from the access device and related metadata information may be updated and/or synchronized with information that may be currently stored on the gateway 118. Additionally, when a device is no longer being serviced by the gateway 118, associated information may be released from the gateway 118. In this regard, the virtual aggregations function performed by the gateway 118 guarantees that the most current information is accessible from the access devices.

Figure 2:
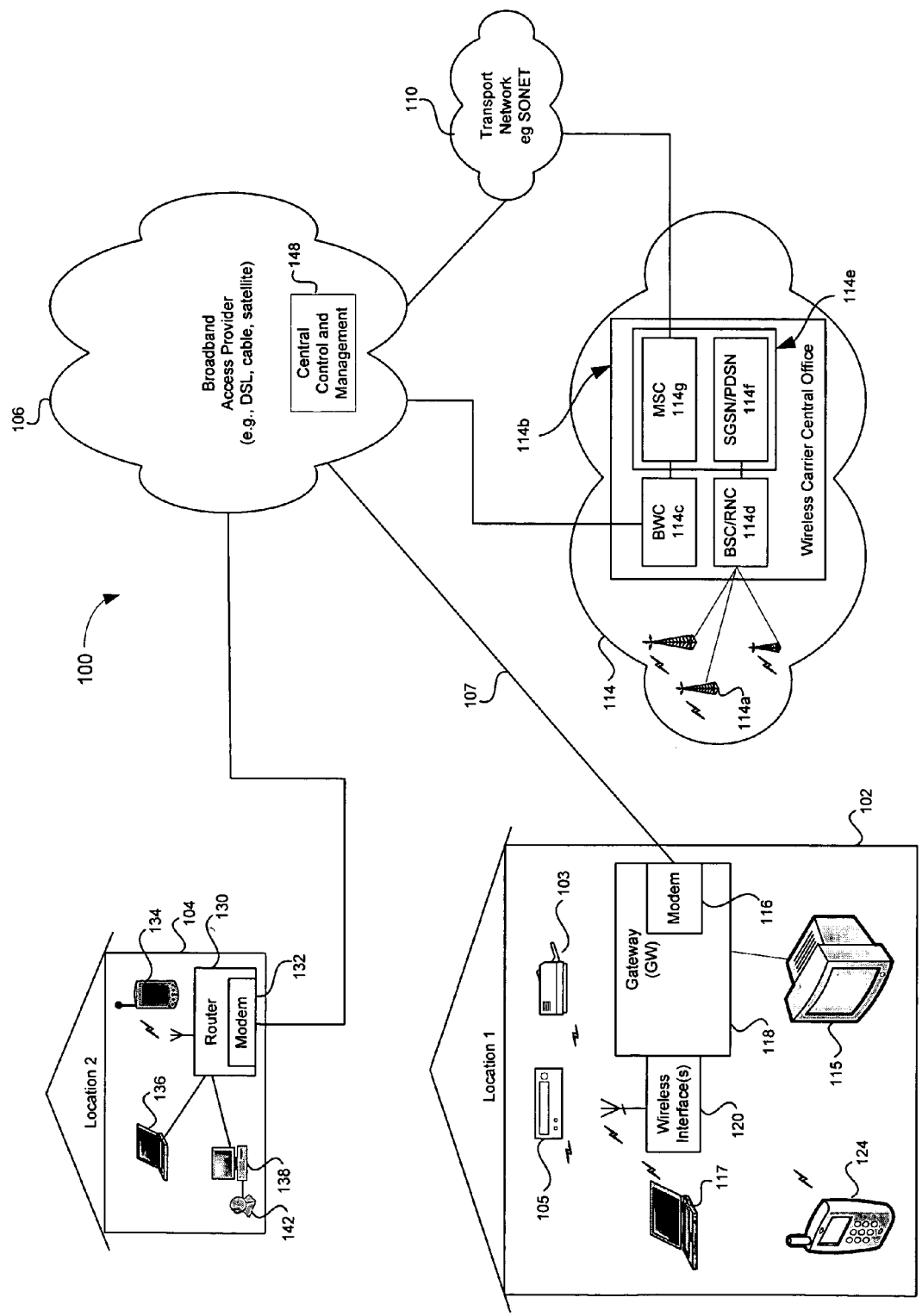
FIG. 2 shows a block diagram illustrating an exemplary communication system, in accordance with a representative embodiment of the present invention.

FIG. 2 shows a block diagram illustrating an exemplary communication system 100, in accordance with a representative embodiment of the present invention. The communication system 100 shown in FIG. 2 comprises a wireless interface 120, a gateway (GW) 118 with a modem 116, a printer 103, and a stereo receiver 105, at location 102. The communication system 100 also comprises an access device 124 that may correspond, for example, to the access devices 122, 124, 126 of FIG. 1. A second location 104 within communication system 100 comprises a router 130 with a modem 132, and a plurality of wireless access devices. The plurality of wireless access devices at the second location 104 may comprise a personal computer (PC) 138, a laptop 136, and a wireless personal digital assistant (PDA) 134. A peripheral such as, for example, a digital camera 142 may be coupled to the personal computer 138. Other peripherals such as, for example, printers, digital scanners, speakers, and the like, which are not shown in FIG. 2, may also be coupled to the personal computer 138 and/or laptop 136. The wireless interface 120 may comprise a plurality of interfaces such as, for example, a Bluetooth interface, a cellular interface, and any combination of an EEE 802.11 a, b, g, and/or n interface, and/or an IEEE 802.15.3a ultrawideband interface. Although the following discussion refers frequently to the capabilities and actions of the gateway 118 and wireless interface 120, the same may be said of the router 130 with the modem 132 of FIGS. 1 and 2, without departing from the spirit and scope of the present invention.

In accordance with a representative embodiment of the present invention, an access device such as access device 124 may be mobile, and may move between the personal area network/wireless local area network coverage provided by wireless interface 120 at location 102, the wide area network coverage provided by, for example, GSM network 114, and the coverage provided by the router 130 and modem 132 at location 104. The location 102 may, for example, be the home of the user of the access device 124, the home of a friend or relative of the user of access device 124, or an office, business, etc., where the user of access device 124 may travel. The location 104 may, for example, be a second home of the user of access device 124, the home of a friend or relative, an office, or may have no personal or business relationship with the user of access device 124. In a representative embodiment of the present invention, the gateway 118 may comprise, for example, a set top box that may be coupled in a wireless or wired fashion to access devices such as, for example, a laptop computer or television, such as the laptop 117 and the television 115 of FIG. 2. Access to the communication bandwidth of a broadband network as previously described may be provided to location 102 by the gateway 118 and the modem 116, and to location 104 via router 130 and modem 132, as shown in FIG. 2. This architecture may provided extended access to wireless networks such as, for example, GSM network 114, CDMA network 112, other cellular/PCS service provider 146, and to Internet 140 and public switched telephone network 108. The modem 116 is shown connected to a broadband access provider (BAP) 106 via a broadband connection 107. The broadband connection 107 may comprise, for example, a digital subscriber line (DSL) connection, a cable network connection, a satellite connection, a T1 or T3 network connection, or similar broadband communication link. The modem 116 is compatible with the broadband connection 107, and may be, for example, a DSL modem, a DOCSIS-compliant cable modem, a satellite service modem, or T1 or T3 compatible modem-type device. The broadband connection may provide access through BAP 106 to location 104, and via transport network 110 to, for example, GSM network 114.

In the example illustration of FIG. 2, a user of the access device 124 may or may not be engaged in communication with another system or subscriber accessible via the GSM network 114. Although the present example of FIG. 2 shows a GSM network 114, a representative embodiment of the present invention may be employed with respect to other wide area networks such as, for example, the CDMA network 112 and other cellular/PCS service provider 146 shown in FIG. 1.

In a representative embodiment of the present invention, a gateway such as, for example, the gateway 118 may use a wireless interface such as, for example, the wireless interface 120 to detect that a compatible access device such as access device 124 may be nearby. Upon sensing the presence of the access device 124, the gateway 118 may elect to transmit via the wireless interface 120, information signaling the existence and identity of the gateway 118, and the services available through the gateway 118 and that may be of interest to the user of access device 124. The services available via gateway 118 may comprise, for example, those supported by or available through other access devices in communication with the gateway 118 and wireless interface 120 at location 102, or via the router 130 at location 104. In a representative embodiment of the present invention, the services may also include those accessible via the BAP 106 of FIG. 1. The decision by gateway 124 of what service information to make known to the access device 124 may depend upon a number of factors including, for example, configuration, authorization, and provisioning information provided by central control and management function 148. The advertisement of available services may be based upon the input of the owner of the gateway 118, or by an operator of the gateway 118. In various representative embodiments of the present invention, the wireless interface 120 and gateway 118, and the router 130 with modem 132 may be individually owned and managed by the owners of location 102 and 104, respectively, or they may be commonly owned and managed by an operator unrelated to the owners of location 102 and 104. In any case, by transmitting information revealing its existence, its identity, and the services available, the gateway 118 may permit a user of the access device 124 to be made aware of opportunities for access to services that were previously unknown to the user.

In another representative embodiment of the present invention, the access device 124, or the gateway 118 and wireless interface 120, or a combination of the above may determine at some point that signal conditions permit the establishment of an acceptable communication path between the access device 124 and the wireless interface 120. The determination may be based, for example, upon signal strength, signal-to-noise ratio, physical location or distance, an error rate, or any combination of the above. The types of parameters used and the conditions under which a communication path may be established may be provided to the access device 124 and/or the gateway 118 and wireless interface 120, by the central control and management block 148. In a representative embodiment of the present invention, such parameters and conditions may be defined via central control and management block 148 when service for the user of access device 124 is provisioned or at a later time, or may be managed by the owner/operator of the gateway 118. In other representative embodiments of the present invention, such parameters and conditions may be defined locally, at the gateway 118.

The information about available services and/or resources may be conveyed to the access device 124 via a number of paths. For example, depending upon the nature of the wireless interface 120, the gateway 118 may advertise the available services and/or resources using short message service (SMS) or multimedia message service (MMS).

When signal conditions permit the establishment of an acceptable communication path between the access device 124 and the wireless interface 120, the access device 124 may communicate, to the gateway 118, parameters that indicate the qualifications and/or capabilities of the access device 124. The gateway 118 may, on its own, provide to the access device 124 information indicating services and/or resources available via the gateway 124. In a representative embodiment of the present invention, the information communicated to the access device 124 by the gateway 118 may not be a complete catalog of services and resources, but may be selected using the parameters shared by the access device 124 with the gateway 118. The selected information on services and/or resources sent to the access device 124 may include only those services and/or resources that match the qualifications and/or capabilities of the access device 124. In another representative embodiment of the present invention, the information communicated to the access device 124 by the gateway 118 may include information on services and/or resources not supported by the access device 124 (e.g., those for which a subscription or fee is charged, or those requiring an upgrade of access device 124) in order to induce the user of access device 124 to pay for the upgrades needed to access to the indicated services and/or resources.

In a representative embodiment of the present invention, a broadband access gateway such as, for example, the gateway 118 of FIG. 2 may download new operating code, code updates, code upgrades, and/or "bug" fixes for operation of the gateway 118, via a broadband network such as, for example, the broadband connection 107 shown in FIG. 2. For example, in one representative embodiment of the present invention, a broadband access gateway such as the gateway 118 may download, upgrade, and/or update operating code for the gateway 118 upon being accessed by an access device that supports services or features that are not presently supported by the gateway 118. A broadband access gateway in accordance with the present invention may, for example, download new, updated, and/or upgraded operating code for processing of new forms of multimedia information. This may include, for example, functionality to support the transcoding of one representation to another. Downloads of new operating code may enable the use of an access device not previously supported.

A broadband access gateway in accordance with a representative embodiment of the present invention may download new, updated, and/or upgraded operating code to an access device, to improve and/or enable the operation of features and/or services. For example, a broadband access gateway such as, for example, the gateway 118 of FIG. 2 may detect that an access device such as, for example, the access device 124 is not currently capable of making use of a particular new service available through the gateway 118. Using identifying information received during registration, the gateway 118 may retrieve and download appropriate new, updated, and/or upgraded operating code to the access device 124, enabling the access device 124 to make use of the new service, and/or fixing errors in the present operating code. The gateway 118 may automatically request and download new and/or updated access device operating code via a broadband network such as, for example, the broadband network supported by the modem 132.

In a representative embodiment of the present invention, the access device 124 may provide a visual indication on the display of access device 124 corresponding to the service and/or resource information received from the gateway 118. For example, upon receiving information indicating that Internet phone access is available, the access device may display an icon of a telephone combined with the letters "IP". Access through the gateway 118 to services provided by wide area network providers such as cellular services, and commercial wireless local area network services may, for example, be indicated by miniatures of their associated logos. When appropriate, the icon may indicate that the service is associated with usage charges, by including, for example, a symbol for the local currency. In a similar manner, if free access is available to services or resources for which there is normally a charge, the visual indication may include a feature recognizable to the user as availability to free access. Given the limited amount of display area in a handheld device, when the number of visual indicators exceeds the display capabilities, various embodiments of the present invention may provide a display cycling through the visual indicators, or may provide, for example, a region of the display through which indicators scroll or crawl.

A representative embodiment of the present invention may provide functionality to support electronic commerce (e-commerce) activities such as, for example, the purchase and sale of goods and services. For example, a broadband access gateway such as gateway 118 of FIG. 2 may contain encryption/decryption and electronic funds/payment functionality to enable a user of an access device to make purchases, pay bills, transfer funds, electronically sign documents, and the like, via a broadband network. Support for secure communication via the broadband network, and via a personal area network(PAN)/wireless local area network (WLAN) via the wireless interface 120 allows a user to engage in financial, business, and personal activities without concern for interception or theft.

Other representative embodiments in accordance with the present invention may provide audible alerts or indications of those services and/or resources available to an access device such as, for example, the access device 124 of FIG. 2. For example, upon approaching a gateway 118 that is capable of supporting the exchange of music, an access device such as the access device 124 of FIG. 2 may produce an audible signal that may be recognized as being associated with music access. The audible signal may be a "service mark" of the music service provider, or it may be a user defined or chosen signal, including, for example, the playback of human speech. If more than one service and/or resource that is accessible to the user of access device 124 is detected, the access device 124 may play a sequence comprised of the audible alerts of the services and/or resources that are currently accessible. For example, the audible sequence may play each time the available services and/or resources change, or at periodic intervals. Still other representative embodiments of the present invention may employ both the visual and audible indications described above.

Figure 3:
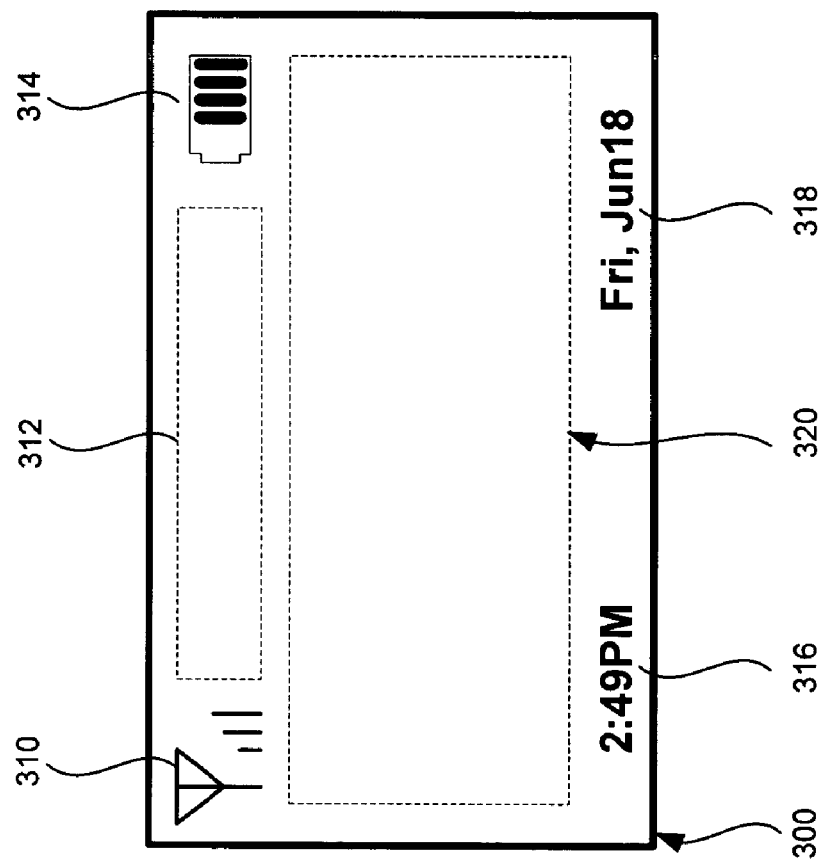
FIG. 3 shows an illustration of a display of an exemplary access device, that may, for example, correspond to a display of an access device such as the access device 124 of FIGS. 1 and 2, for example, in accordance with a representative embodiment of the present invention.

FIG. 3 shows an illustration of a display 300 of an exemplary access device that may, for example, correspond to a display of an access device such as the access device 124 of FIGS. 1 and 2, for example, in accordance with a representative embodiment of the present invention. The display 300 of FIG. 3 comprises a network indicator 310, a network services indicator area 312, a battery life indicator 314, a time of day indicator 316, and a day and date indicator 318. The battery life indicator 314 is arranged to show the charge left in the batteries powering the access device, the time of day indicator 316 shows the time of day, and the day and date indicator 318 shows the current day and date. The display 300 may also comprise a display area 320 (shown in FIG. 3 without content) to allow the access device having display 300 to show graphical or textual information for a variety of reasons and from a number of sources.

In a representative embodiment of the present invention, as shown in the illustration of FIG. 3, the network indicator 310 may represent that the access device 124 is currently operating in a mode permitting communication via a wide area network (WAN) such as, for example, the GSM network 114 or CDMA network 112 of FIG. 1. The network indicator 310 may also be capable of indicating an operating mode supporting communication using, for example, a personal area network (PAN) such as, for example, a Bluetooth network, an ultra-wideband network, an IEEE 802.15 compatible network, or a wireless local area network (WLAN) such as, for example, a WiFi (EEE 802.11) network. The network indicator 310 may indicate that signals of acceptable strength or quality have been detected, and may provide a graphical representation such as, for example, a series of lines next to an antenna icon that may represent the strength of the received signal. As illustrated in FIG. 3, the portion of the display 300 reserved for a network services indicator area 312 is blank, indicating that access to network services is currently not available.

Figure 4:
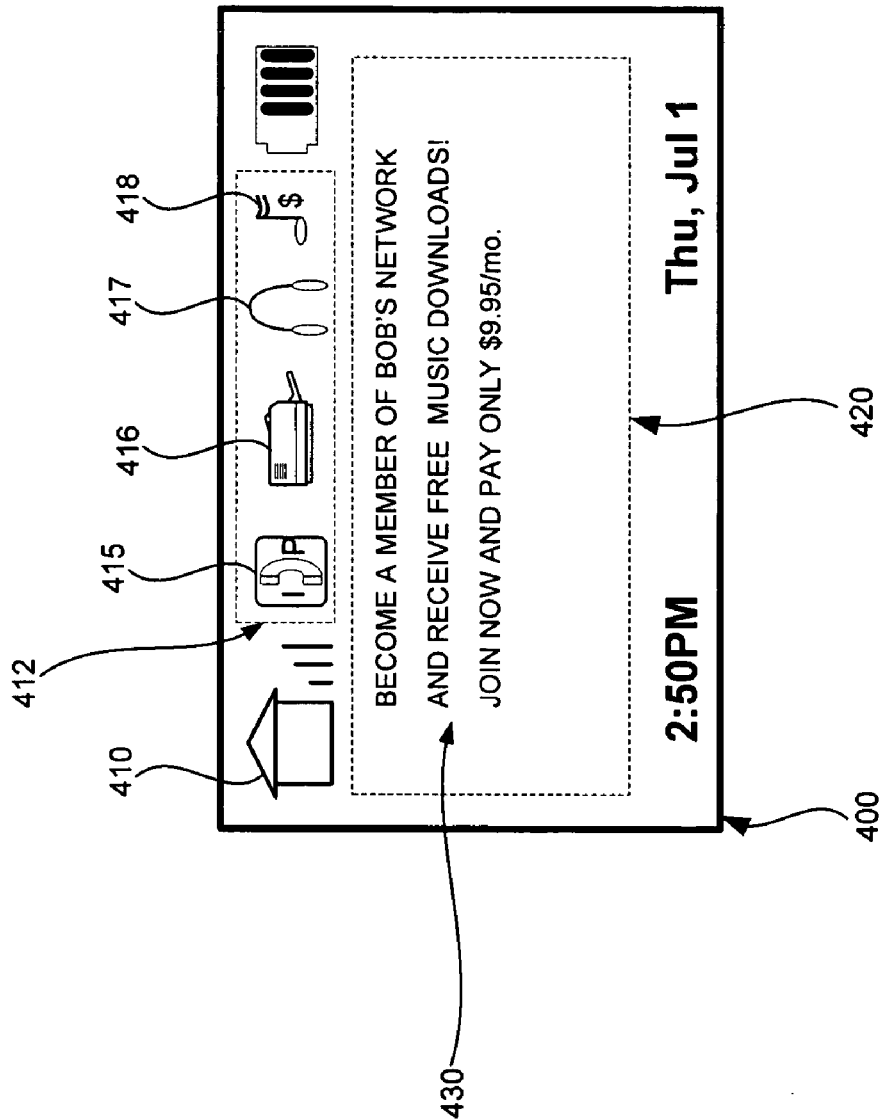
FIG. 4 shows an illustration of a display of an exemplary access device that may, for example, correspond to a display of the access device of FIGS. 1 and 2, for example, in accordance with another representative embodiment of the present invention.

FIG. 4 shows an illustration of a display 400 of an exemplary access device that may, for example, correspond to a display of the access device 124 of FIGS. 1 and 2, in accordance with a representative embodiment of the present invention. As shown in the illustration of FIG. 4, the display 400 comprises a network indicator 410, a battery life indicator, a time of day indicator, and a day and date indicator similar in form and function to those shown in FIG. 3. In accordance with a representative embodiment of the present invention, the display 400 may also comprise a network services indicator area 412, and a display area 420 to allow the access device having display 400 to show graphical or textual messages for a variety of reasons and from a number of sources.

In the representative embodiment shown in the illustration of FIG. 4, the network services indicator area 412 comprises an Internet protocol (IP) phone service icon 415, a printer service icon 416, a stereo entertainment icon 417, and a pay music service icon 418. The visibility of each of the icons 415, 416, 417, 418 in the network services indicator area 412 may signal that a corresponding media-related or other service is available via the network represented by the network indicator 410. Media-related services include, for example, the accessing, recording, playing, exchanging, transmitting, receiving, converting, and translating of multimedia information, access to information about media availability and media sources and services, and fee-based media services. Other services may include the download of new, upgraded and/or updated operating code for access devices and/or a broadband access gateway, to enable access devices to operate with new multimedia information and new services, and for broadband access gateways to support the functionality of new types of access devices. In addition, support for e-commerce functions such as, for example, the buying and selling of goods and services, may also be provided. In addition, the network services indicator area 412 and/or the display area 420 may include information concerning the quality of service (QoS) of the services represented. The media for which such services may be available may include, for example, streaming video, broadcast video, voice, digital data, text, digitized audio, digitized still images, digitized video, and digitized music.

In a representative embodiment of the present invention, the network indicator 410 may, for example, be capable of uniquely indicating the presence of the various networks supported by, for example, the gateway 118 and wireless interface 120, or the router 130, of FIG. 2. For example, in a representative embodiment of the present invention, the access device 124 of FIG. 2 may be a GSM-capable wireless handset, and the wireless interface 120 of FIG. 2 may be a microcell compatible with GSM standards. The wireless interface 120 (i.e., microcell) may be capable of establishing communication with the GSM capable wireless handset. The GSM capable wireless handset may move into the coverage area of the gateway 118 and wireless interface 120. Upon detecting the presence of the coverage area provided by the gateway 118 with wireless interface 120, the network indicator 410 may show a graphical image recognizable as being representative of a GSM network, or of the provider of GSM service through gateway 118 and wireless interface 120.

In a representative embodiment of the present invention, the gateway 118 may, for example, be equipped to provide access to a network capable of supporting IP telephony, and the gateway 118 may advertise that fact to a nearby access device 124 (e.g., the GSM capable wireless handset) by sending service information via the wireless interface 120. Receipt of such information from the gateway 118 and wireless interface 120 may prompt the access device 124, in this case a GSM wireless handset, to display an icon such as, for example, the IP phone service icon 415, in the network services indicator area 412. The information transmitted by the gateway 118 or router 130 may comprise sufficient details to provide the user with a visual identification of the provider of the service offered. Additional information advertising services may also be transmitted by the gateway 118. For example, textual information describing pricing, special features, provider identity, contact information, and/or location of the service or gateway provider, and other information, may be made visible in the display area 420. In the example shown in FIG. 4, an attempt is made to motivate the user of the access device 124 using a textual sales pitch 430 sent through a gateway in accordance with a representative embodiment of the present invention. Upon considering such information, the user of the access device 124 (i.e., GSM compatible wireless handset) may elect to access the advertised service, and place an IP voice or data call through the gateway 118. Aspects of the present invention may permit users of access devices such as, for example, those described above with respect to FIGS. 1 and 2 to take advantage of services, the availability of which they may have been previously unaware. Although the above example has been given in terms of a GSM handset gaining access to IP phone service, the present invention is not limited in this respect, as other access devices, gateways, wireless interfaces, and services may be employed, without departing from the scope and spirit of the present invention.

The network services indicator area 412 as illustrated in FIG. 4 demonstrates the ability of a representative embodiment in accordance with the present invention to support the advertisement of a variety of services. As shown in FIG. 4, the network services indicator area 412 comprises not only an IP phone services icon 415, discussed above, but also a printer service icon 416, a stereo entertainment icon 417, and a pay music service icon 418. The printer services icon 416 may, for example, represent a service through which the user of the access device 124 may print information available on the access device 124, or from sources accessible through, for example, an internet browser present on the access device 124. Such access may make use of a printer such as, for example, the printer 103 at location 102 of FIG. 2. The stereo entertainment icon 417 may, for example, represent that a nearby gateway such as gateway 118 and wireless interface 120, or a router such as, for example, router 130, of FIG. 2, may offer access to stereo audio from, for example, commercial FM stereo broadcast sources. The stereo 105 in FIG. 2 represents one possible source of such audio signals. The pay music service icon 418 may be used, for example, to notify a user that access to fee-based music download or streaming service is available. The dollar sign ($) element of the pay music service icon 418 may be used, for example, to signal the user of the access device that the users of the service incur extra charges.

Although only four media-related services are illustrated in the above example, various embodiments of the present invention may be capable of supporting a greater or lesser number of services, and may also provide information related to resources available through a gateway or router such as, for example, the gateway 124 and router 130, of FIG. 2, without departing from the spirit of the present invention. To overcome the limitation of the size of the display on access devices such as those described previously, the display of icons may, for example, be time sequenced within a display area such as the network services indicator area 412, or may use scrolling or "crawling" of icons across an area of a display such as the display 400 of FIG. 4. Parameters related to such display techniques may also be transmitted with the service advertisement information provided by various representative embodiments of the present invention.

The display of icons in the network services indicator area 412 of an access device in accordance with a representative embodiment of the present invention may be accompanied by an audible signal, to catch the attention of the user of the access device. The characteristics of the audible signal may, for example, be specified in the service advertisement information transmitted to the access device. So that users of an access device such as, for example, the access device 124 of FIG. 2 may be made aware of changes in service access, the service advertisements transmitted by a gateway or router-type device may define the characteristics of the audible signal. For example, a gateway providing public Internet access may transmit an advertisement of service that produces a recognizable audible signal, at all locations at which the service is available. The recognizable audible qualities of the advertisement may permit access device users to be alerted to a needed service without stopping to check a visual display. The audible announcement provided through such an advertisement may be customizable through, for example, the central control and management block 148 of FIG. 2.

In a representative embodiment of the present invention, the service advertisement sent to a particular access device such as, for example, the access device 124 discussed above and illustrated in FIGS. 1 and 2, may be based upon information received from the access device. To illustrate, information describing the capabilities of the access device may be received by a gateway or router such as, for example, the gateway 124 and router 130 of FIG. 2 in messages solicited from, or sent autonomously from, the access device. The capability information may indicate, for example, that an access device has the ability to store and play MP3 encoded music, or to play MPEG video files. The capability information may reveal that the access device may engage in communication using a variety of wireless standards, support data exchange at certain bandwidths, or that the user has certain preferences or interests in services. The capability information may comprise parameters that may identify services subscribed to, and subscriber specific information. By qualifying the transmission of service advertisements based upon subscriber-associated parameters and access device capabilities, an embodiment in accordance with the present invention may better tailor transmission of service advertisements, conserving communication bandwidth, and thereby maintaining quality of service and better controlling costs.

Figure 5:
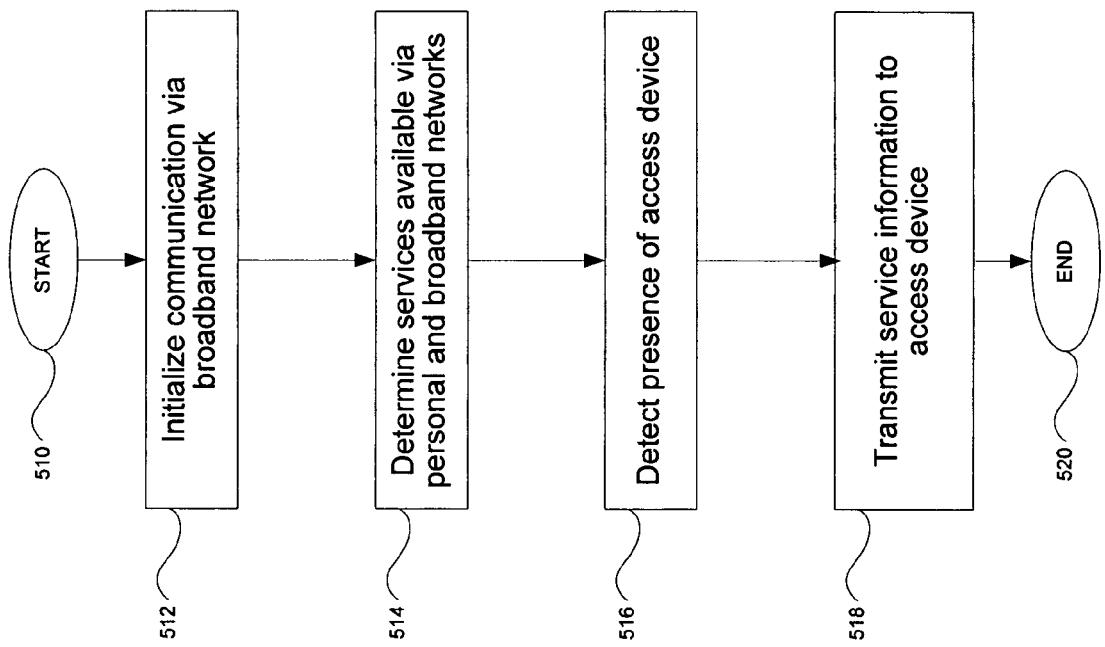
FIG. 5 shows a flowchart illustrating an exemplary method of operating a gateway supporting extended network access services advertising such as, for example, the gateway of FIGS. 1 and 2, for example, in accordance with a representative embodiment of the present invention.

FIG. 5 shows a flowchart illustrating an exemplary method of operating a gateway supporting extended network access services advertising such as, for example, the gateway 118 of FIGS. 1 and 2, in accordance with a representative embodiment of the present invention. The following description of the exemplary method of FIG. 5 makes reference to the elements of FIGS. 1 and 2. The method illustrated in FIG. 5 begins following the starting of the gateway 124 (510). The method then initializes communication via a broadband network such as, for example, a DSL, cable, or Internet network connecting gateway 124 to BAP 106 (512). Initializing communication may comprise, for example, establishing physical and higher layer connectivity to network resources, servers, and other entities. The gateway may then determine the media-related services that are available via connected personal and broadband networks (514). Examples of media-related services that may be available include accessing, recording, playing, exchanging, transmitting, receiving, converting, and translating of multimedia information, access to information about media availability and media sources and services, and fee-based media services. At some later time, the gateway may detect the presence of an access device (516). The detection of an access device in the vicinity of the gateway may prompt the gateway to transmit to the access device, the information on the services available through the gateway (518). The method as shown in FIG. 5 then ends (520).

Figure 6:
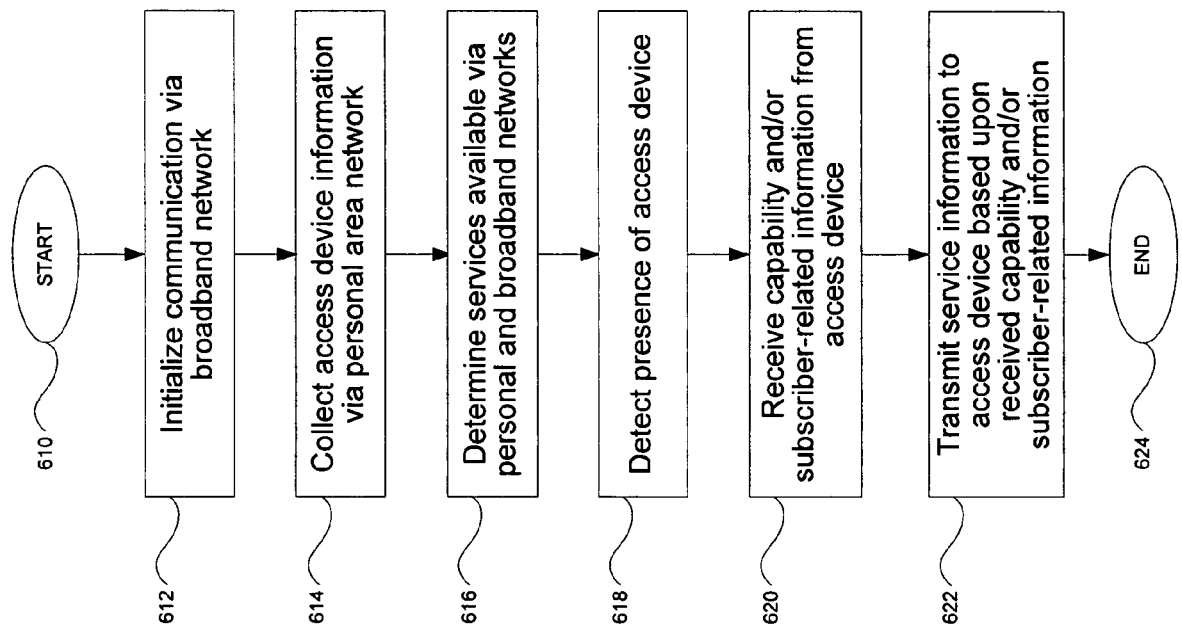
FIG. 6 shows a flowchart illustrating an exemplary method of operating a gateway supporting extended network access services advertising such as, for example, the gateway of FIGS. 1 and 2, for example, in accordance with another representative embodiment of the present invention.

FIG. 6 shows a flowchart illustrating an exemplary method of operating a gateway supporting extended network access services advertising such as, for example, the gateway 118 of FIGS. 1 and 2, in accordance with another representative embodiment of the present invention. The following description of the exemplary method of FIG. 6 makes reference to the elements of FIGS. 1 and 2. The method illustrated in FIG. 6 begins following the starting of the gateway 124 (610). The method then initializes communication via a broadband network such as, for example, a DSL, cable, or Internet network connecting gateway 124 to BAP 106 (612). Initializing communication may comprise, for example, establishing physical and higher layer connectivity to network resources, servers, and other entities. Next, a gateway in accordance with the present invention may collect access device information via a personal area network such as, for example, the personal area network supported by the wireless interface 120 (614). Such information may, for example, comprise information identifying the location, type, size, origin and/or owner, and restrictions for access. The gateway may then determine the media-related services and other functionality that are available via connected personal and broadband networks (616). Examples of media-related services that may be available include accessing, recording, playing, exchanging, transmitting, receiving, converting, and translating of multimedia information, access to information about media availability and media sources and services, and fee-based media services. Other functionality that may be available includes, for example, electronic commerce support. At some later time, the gateway may detect the presence of an access device (618). The gateway may also receive capability and/or subscriber-related information from the access device (620). Following the receipt of the capability and/or subscriber-related information, or periodically thereafter, the gateway may transmit to the access device service advertisements, based upon the received capability and/or subscriber-related information (622). The method as shown in FIG. 6 then ends (624).

The local area networks may include data networks such as, for example, Institute of Electrical and Electronics Engineer (IEEE) 802.11a/b/g/n compliant wireless networks such as those located in homes, hot spots or an office. Such local area networks may operate in unlicensed radio frequency spectrum such as in, for example, the 2.4 and 5 gigahertz regions. Examples of wide area networks may include cellular digital packet data (CDPD), voice and data networks such as public switched telephone networks (PSTN), Global System For Mobile Communication (GSM), GSM General Packet Radio Service (GPRS), GSM Short Message Service (SMS), GSM Enhanced Data Rates For Global Evolution (EDGE), North American Time Division Multiplex Access (TDMA), iDEN, Code Division Multiple Access (CDMA) and CDMA2000 1XRT, Universal Mobile Telecommunications System (UMTS) network, to name only a few.

A personal area network (PAN) may be formed by a plurality of wireless communication access devices such as, for example, mobile multimedia handsets, PDAs, telephones, and computers. Other elements of such a network may, for example, include computer peripherals such as digital scanners, digital cameras, printers, headphones, and pointing devices, that may be located within the immediate proximity of a person. A PAN may be an ad-hoc network of such communication devices. In a representative embodiment of the present invention, access devices within the PAN may communicate with other access devices within the PAN and also with other access devices that are located in other networks accessible via the PAN. The personal area networks may include data networks such as, for example, a Bluetooth compliant network, and Institute of Electrical and Electronics Engineer (IEEE) 802.15.3a compliant wireless networks. Such personal area networks may operate in unlicensed radio frequency spectrum such as, for example, the 2.4 and 5 gigahertz regions. Details of one example of a personal area network are provided in the document "Bluetooth Core Specification V1.2", Nov. 5, 2003, from Bluetooth SIG, Inc., the complete subject matter of which is hereby incorporated herein by reference, in its entirety. For example, in a Bluetooth® wireless PAN, a first Bluetooth®-enabled wireless access device may communicate with a second Bluetooth®-enabled wireless access device within the PAN. Additionally, either of the first and second Bluetooth®-enabled wireless access devices may communicate with the Internet or another LAN or WAN via the Bluetooth® wireless PAN.

In a representative embodiment of the present invention, a gateway may be adapted to provide seamless and transparent communication between a plurality of access devices and a plurality of networks. The functionality of the gateway may be divided, for example, into application content functionality, and configuration and management functionality. The application content functionality may, for example, deal with the types of applications that may be supported by the gateway as well as the various types of data that may be received, processed and/or transmitted by the gateway. In this regard, application content functionality may also include the manner in which other devices and/or systems may utilize data from the gateway.

Content and application services are important because all the information coming into and leaving the home from either the WAN side (i.e., the broadband connection side), or from the PAN side (i.e., the access device side) converges at the gateway. The PAN side may comprise Bluetooth, wireless LAN (IEEE 802.11 a/b/g/n), IEEE 802.15.3a ultrawideband, or cellular, for example. Notwithstanding, the gateway may be adapted to convert, for example, wirelessly received GSM-formatted information into, for example, Internet protocol (IP)-formatted information and in reverse, converts IP-formatted information into wireless GSM-formatted information suitable for over-the-air transmission. Support for other wireless communication protocols such as TDMA, CDMA, and UMTS may also be provided. In a representative embodiment of the present invention, the gateway may comprise suitable circuitry, logic and/or code that may be adapted to receive and process MPEG related data, which may be suitable for display on a screen. The gateway in an embodiment of the present invention functions as a focal point where data converges from a plurality of wired and wireless services. Although, in a particular embodiment of the present invention the gateway may do very little in terms of actual content aggregation, there is virtual aggregation of data. The converged data may be integrated and or otherwise utilized to offer unique opportunities for launching various content and application services from a single strategic location. Since the gateway in an embodiment of the present invention is the focal point where data converges, one or more protocol stacks may be employed for launching the various content and application services.

The gateway in a representative embodiment of the present invention may be adapted to route calls based on established rules that may be programmed into the gateway. For example, the gateway may be governed by a rule which states that local calls are to be routed to an incumbent local exchange carrier (iLEC), while long distance calls are to be handled by Long Distance Carrier Company. Accordingly, when a call originates at the gateway and it is determined that the call is a local call, the gateway may be adapted to route the call to the iLEC. However, if the gateway determines that the call is a long distance call, then the gateway may be adapted to route the call to Long Distance Carrier Company.

Some companies have attempted to solve the cost and signal propagation or penetration problems in homes and small businesses by utilizing a micro-cellular tower that is installed inside the homes or small businesses. The microcellular tower (microcell) may be adapted to utilize unlicensed spectrum such as, for example, 2.4 GHz, and may generally function as a gateway and/or bridge. The gateway may actually function more like a bridge rather than an actual gateway. The backhaul links utilized by such a gateway may leverage existing broadband infrastructure that is commonly found in many homes and businesses today. Because a consumer is already paying for the use of the broadband infrastructure in their home or office, leveraging the use of the existing broadband infrastructure for the backhaul link results in minimal or no backhaul costs. The broadband infrastructure may be, for example, a cable or DSL infrastructure.

The wireless interface function provided by the gateway located within a home, for example, may be utilized to route or backhaul a great deal of traffic to a wired network such as a broadband network or a wireless network such as a GSM or CDMA network via a broadband connection. In other words, the microcellular tower or gateway infrastructure provided within a home provides a scalable network infrastructure that rides on an existing access infrastructure already supplied by a broadband service provider to a home, office or business. Additionally, the scalable infrastructure provided by the gateway also solves the problems associated with signal penetration and propagation, thereby providing improved quality of service (QoS). From a market perspective, a wireless service provider may now have access to the necessary infrastructure to provide improved wireless services to users within a home or office. Accordingly, in order to rapidly increase their growth, wireless service providers may now target that portion of the in-home landline or plain old telephone system (POTS) business, which have traditionally been handled by incumbent local exchange carriers (ILECs) or other LECs.

The unlicensed mobile access gateway described above may possess a significant amount of processing power, but it primarily addresses the problems associated with backhaul, propagation and cost. The gateways of existing systems fall short of realizing the full potential of the merged wired and wireless communication networks. Numerous basic and enhanced communication services may be enabled or provided by the gateway. Support for access devices such as, for example, mobile multimedia handsets and PDAs may be required in order to utilize these basic and enhanced communication services enabled by the new wave of digital technologies. Current and/or proposed mobile access gateway systems, however, do not provide the range of support needed for their use by the everyday consumer.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A system supporting advertising of user accessibility to multimedia services, the system comprising:
    a gateway communicatively coupled to a broadband network and at least one wireless interface, the gateway capable of selectively exchanging multimedia information among the at least one wireless interface and the broadband network, and of communicating with a plurality of access devices via the at least one wireless interface;
    the gateway capable of providing to the plurality of access devices via the at least one wireless interface, access to at least one media-related service;
    the gateway transmitting service information comprising a service advertisement of selectable services offered by the gateway, via the at least one wireless interface, to at least a portion of the plurality of access devices;
    the at least a portion of the plurality of access devices notifying a user of the received service information comprising the service advertisement of the selectable services offered by the gateway; and
    the gateway downloading, upgrading and/or updating operating code when at least one of the plurality of access devices that supports services or features that are not presently supported by the gateway gains access to the gateway.

2. The system according to claim 1 wherein the multimedia information comprises one or more of streaming video, broadcast video, voice, digital data, text, digitized audio, digitized still images, digitized video, and/or digitized music.

3. The system according to claim 1 wherein the at least one media-related service comprises one or more of accessing, recording, playing, exchanging, transmitting, receiving, converting, and/or translating.

4. The system according to claim 1 wherein the gateway is capable of downloading executable code for operating one or both of the gateway and/or an access device.

5. The system according to claim 1 wherein service information comprises information indicating the availability of media-related services.

6. The system according to claim 1 wherein the at least one wireless interface is compliant with the Bluetooth V1.2 or compatible personal area network (PAN) specification.

7. The system according to claim 1 wherein the at least one wireless interface is compliant with one or more of the Institute of Electrical and Electronics Engineers (IEEE) 802.11a, 802.11b, 802.11g, and/or 802.11n standards.

8. The system according to claim 1 wherein the at least one wireless interface communicates using an unlicensed frequency band.

9. The system according to claim 8 wherein the at least one wireless interface communicates at a frequency of approximately 2.4 gigahertz.

10. The system according to claim 1 wherein the broadband network comprises one or more of a digital subscriber line (DSL) network, a cable network, a satellite network, a cellular network, and/or the Internet.

11. The system according to claim 10 wherein the cellular network comprises one or more of a global system for mobile communications (GSM) network, a time division multiple access (TDMA) network, a code division multiple access (CDMA) network, and/or a universal mobile telecommunications system(UMTS) network.

12. The system according to claim 1 wherein notifying comprises displaying a visual indication based upon the service information.

13. The system according to claim 1 wherein notifying comprises playing an audible indication based upon the service information.

14. The system according to claim 1 wherein the gateway collects access-related information for one or both of the plurality of access devices and/or the broadband network.

15. The system according to claim 14 wherein the gateway manages access to the collected information.

16. The system according to claim 1 wherein the plurality of access devices comprises one or more of a mobile multimedia handset, a personal digital assistant (PDA), a personal computer (PC), a digital scanner, a digital camera, a printer, headphones, and/or a pointing device.

17. The system according to claim 1 wherein the transmitted service information is based upon one or both of subscriber information and/or capability information indicating the ability of an access device to use multimedia information.

18. The system of claim 1, wherein the service advertisement of selectable services comprises only services and/or resources that match qualifications and/or capabilities of the plurality of access devices.

19. The system of claim 1, wherein the gateway automatically requests and downloads new and/or updated access device operating code via the broadband network upon detecting that at least one of the plurality of access devices is not capable of making use of a particular service available through the gateway.

20. A method of operating a gateway supporting advertising of multimedia information services, the method comprising:
  initializing communication via a broadband network;
  determining, via one or more of a personal area network, a wireless local area network, and/or the broadband network, service information comprising availability of media-related services and a service advertisement of selectable services offered by the gateway;
  detecting, via one or both of the personal area network and/or the wireless local area network, the presence of an access device;
  downloading, upgrading and/or updating operating code when the access device that supports services or features that are not presently supported by the gateway gains access to the gateway; and
  transmitting the service information comprising the availability of media-related services and the service advertisement of the selectable services offered by the gateway to the access device via the one or both of the personal network and/or the wireless local area network.

21. The method according to claim 20 further comprising:
  collecting, via one or more of the personal area network, the wireless local area network, and/or the broadband network, information comprising accessibility of at least one access device.

22. The method according to claim 20 further comprising:
  receiving one or both of subscriber information and/or capability information indicating the ability of an access device to use multimedia information.

23. The method according to claim 20 wherein the personal area network is compliant with the Bluetooth V1.2 or compatible personal area network (PAN) specification.

24. The method according to claim 20 wherein the personal area network communicates using an unlicensed frequency band.

25. The method according to claim 20 wherein the personal area network communicates at a frequency of approximately 2.4 gigahertz.

26. The method according to claim 20 wherein the wireless local area network is compliant with one or more of the Institute of Electrical and Electronics Engineers (IEEE) 802.11a, 802.11b, 802.11g, and/or 802.11n standards.

27. The method according to claim 20 wherein the broadband network comprises one or more of a digital subscriber line (DSL) network, a cable network, a satellite network, a cellular network, and/or the Internet.

28. The method according to claim 27 wherein the cellular network comprises one or more of a global system for mobile communications (GSM) network, a time division multiple access (TDMA) network, a code division multiple access (CDMA) network, and/or a universal mobile telecommunications system(UMTS) network.

29. The method according to claim 20 wherein the multimedia information comprises one or more of streaming video, broadcast video, voice, digital data, text, digitized audio, digitized still images, digitized video, and/or digitized music.

30. The method according to claim 20 wherein the at least one access device comprises one or more of a mobile multimedia handset, a personal digital assistant (PDA), a personal computer (PC), a digital scanner, a digital camera, a printer, headphones, and/or a pointing device.

31. The method of claim 20, wherein the service advertisement of selectable services comprises only services and/or resources that match qualifications and/or capabilities of the plurality of access devices.

32. The method of claim 20, comprising automatically requesting and downloading new and/or updated access device operating code via the broadband network upon detecting that the access device is not capable of making use of a particular service available through the gateway.

33. A non-transitory machine-readable storage, having stored thereon a computer program having a plurality of code sections for operating a gateway supporting advertising of multimedia information services, the code sections executable by a machine for causing the machine to perform the operations comprising:
  initializing communication via a broadband network;
  determining, via one or more of a personal area network, a wireless local area network, and/or the broadband network, service information comprising availability of media-related services and a service advertisement of selectable services offered by the gateway;
  detecting, via one or both of the personal area network and/or the wireless local area network, the presence of an access device;
  downloading, upgrading and/or updating operating code when the access device that supports services or features that are not presently supported by the gateway gains access to the gateway; and
  transmitting the service information comprising the availability of media-related services and the service advertisement of the selectable services offered by the gateway to the access device via the one or both of the personal network and/or the wireless local area network.

34. The non-transitory machine-readable storage according to claim 33 wherein the code sections executable by a machine further causing the machine to perform the operations comprising:
  collecting, via one or more of the personal area network, the wireless local area network, and/or the broadband network, information comprising accessibility of at least one access device.

35. The non-transitory machine-readable storage according to claim 33 wherein the code sections executable by a machine further causing the machine to perform the operations comprising:
  receiving one or both of subscriber information and/or capability information indicating the ability of an access device to use multimedia information.

36. The non-transitory machine-readable storage according to claim 33 wherein the personal area network is compliant with the Bluetooth V1.2 or compatible personal area network (PAN) specification.

37. The non-transitory machine-readable storage according to claim 33 wherein the wireless local area network is compliant with one or more of the Institute of Electrical and Electronics Engineers (IEEE) 802.11a, 802.11b, 802.11g, and/or 802.11n standards.

38. The non-transitory machine-readable storage according to claim 37 wherein the personal area network communicates at a frequency of approximately 2.4 gigahertz.

39. The non-transitory machine-readable storage according to claim 33 wherein the personal area network communicates using an unlicensed frequency band.

40. The non-transitory machine-readable storage according to claim 33 wherein the broadband network comprises one or more of a digital subscriber line (DSL) network, a cable network, a satellite network, a cellular network, and/or the Internet.

41. The non-transitory machine-readable storage according to claim 40 wherein the cellular network comprises one or more of a global system for mobile communications (GSM) network, a time division multiple access (TDMA) network, a code division multiple access (CDMA) network, and/or a universal mobile telecommunications system(UMTS) network.

42. The non-transitory machine-readable storage according to claim 33 wherein the multimedia information comprises one or more of streaming video, broadcast video, voice, digital data, text, digitized audio, digitized still images, digitized video, and/or digitized music.

43. The non-transitory machine-readable storage according to claim 33 wherein the at least one access device comprises one or more e of a mobile multimedia handset, a personal digital assistant (PDA), a personal computer (PC), a digital scanner, a digital camera, a printer, headphones, and/or a pointing device.

44. The non-transitory machine-readable storage of claim 33, wherein the service advertisement of selectable services comprises only services and/or resources that match qualifications and/or capabilities of the plurality of access devices.

45. The non-transitory machine-readable storage of claim 33, comprising automatically requesting and downloading new and/or updated access device operating code via the broadband network upon detecting that the access device is not capable of making use of a particular service available through the gateway.

* * * * *